March 16, 1948.  P. V. WHITNEY  2,438,083
CONVEYOR
Filed March 11, 1943  2 Sheets-Sheet 1
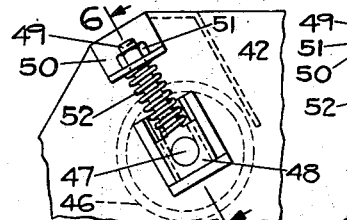
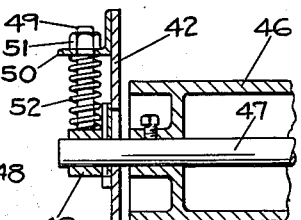
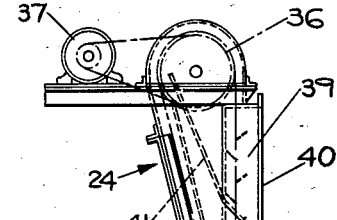
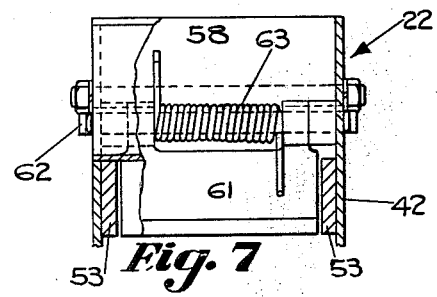
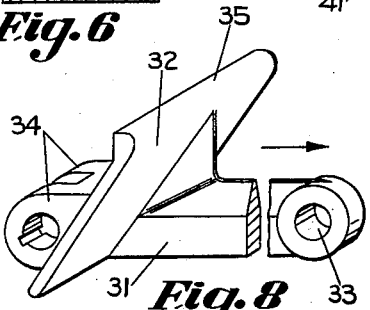
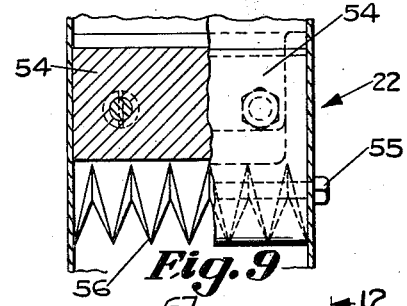
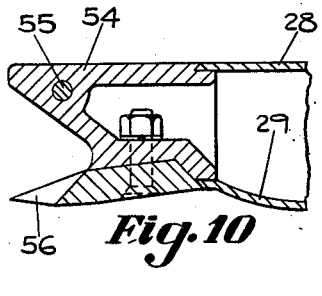
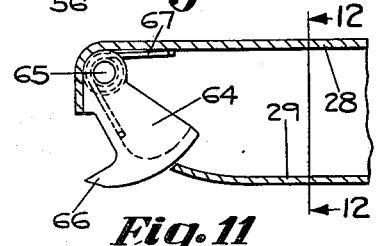
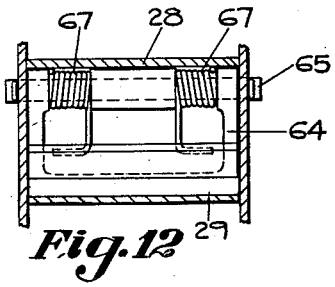
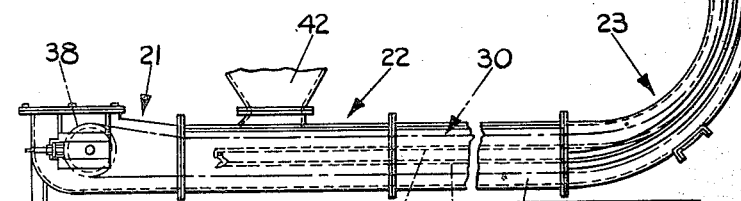
INVENTOR:
PAUL V. WHITNEY,
By Chas. M. Nissen,
ATT'Y March 16, 1948.  P. V. WHITNEY  2,438,083
CONVEYOR
Filed March 11, 1943    2 Sheets-Sheet 2
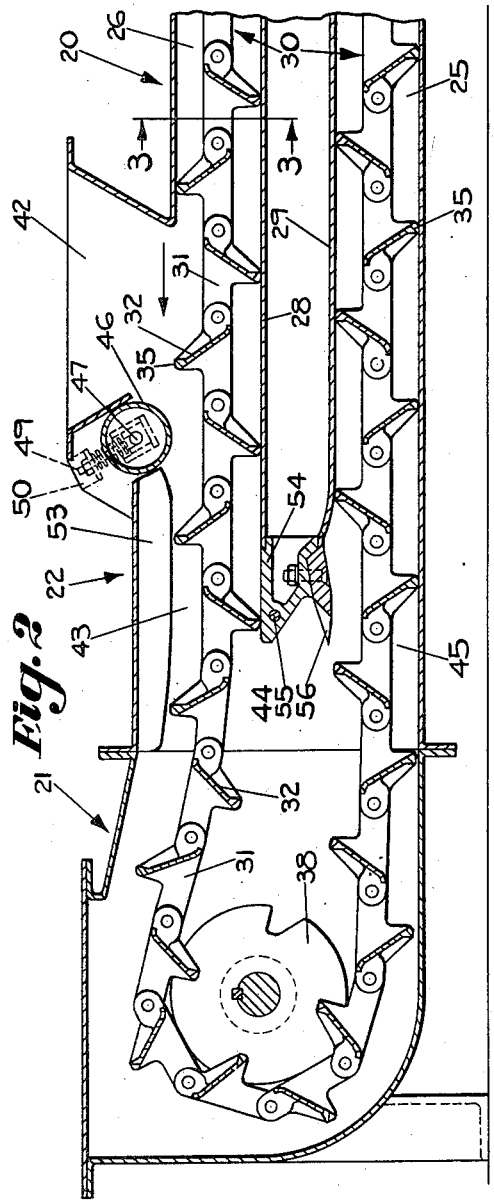
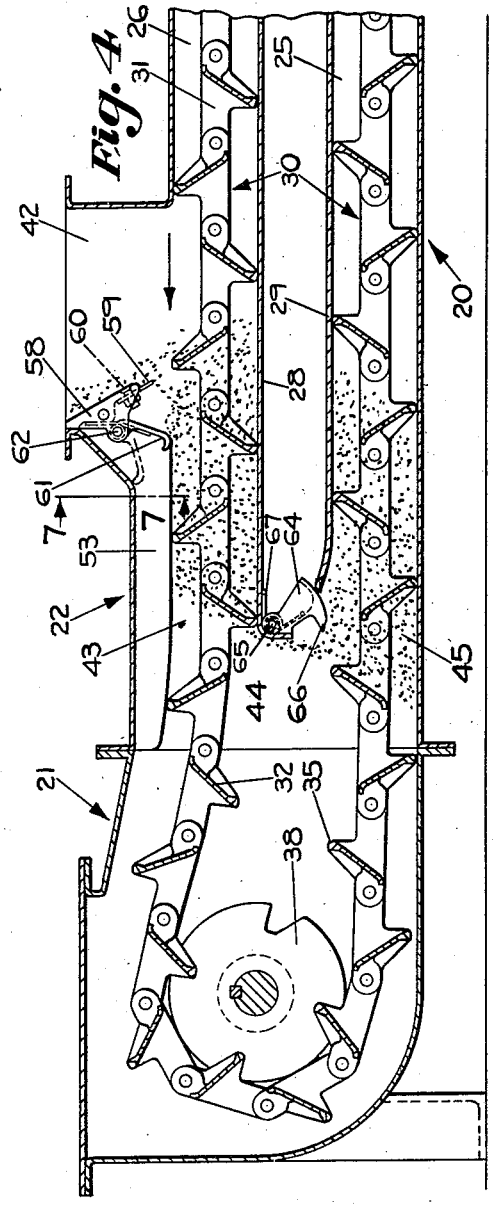
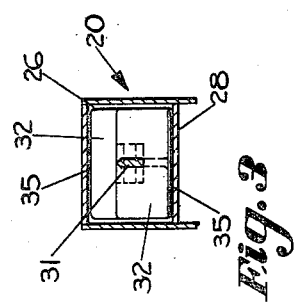
INVENTOR:
PAUL V. WHITNEY,
By Chas. M. Nissen,
ATT'Y.

Patented Mar. 16, 1948

2,438,083

UNITED STATES PATENT OFFICE 2,438,083

CONVEYOR

Paul V. Whitney, Columbus, Ohio, assignor, by mesne assignments, to The Jeffrey Manufacturing Company, a corporation of Ohio Application March 11, 1943, Serial No. 478,781

13 Claims. (Cl. 198—168)

This invention relates to a conveyor of the type which has a substantially totally enclosing working leg and also preferably a totally enclosing return leg.

An object of the invention is to provide improved chain and sprocket conveyor mechanism for a conveyor of the above-mentioned type.

Another object of my invention is to provide an improved conveyor including an enclosing casing through which there travels a chain having flights making acute angles with respect to the axis of the chain and spacing the chain substantially centrally within the casing and away from its walls.

In carrying out the foregoing object it is another object of my invention to form or cause the chain to include or carry successive flights each of which extends in the casing to one side of the chain, the flights being arranged on opposite sides of the chain for spacing the chain substantially centrally within the housing and away from its walls leaving the area in the casing opposite each flight unobstructed, the flights lying in planes which form acute angles with respect to the axis of the chain, the outer or leading edge of each flight traveling through the casing in advance of the inner edge thereof.

Still another object of the invention is to provide an improved feed section for a conveyor of the above-mentioned type which will prevent damage to the conveyor casing or the chain and flight conveyor mechanism, particularly when material having large granular particles, such as coal, is conveyed by the conveyor.

Other objects of the invention will appear hereinafter, the novel features and combinations being set forth in the appended claims.

In the accompanying drawings,

Fig. 1 is a side elevational view of the conveyor incorporating the features of my invention;

Fig. 2 is a sectional elevational view of the feed and foot sections of the conveyor;

Fig. 3 is a sectional view taken on the line 3—3 of Fig. 2, looking in the direction of the arrows;

Fig. 4 shows a modified form of feed section as compared with that of Fig. 2;

Fig. 5 is an enlarged detailed side view of a portion of the feed section control mechanism of Fig. 2;

Fig. 6 is a sectional view taken on the line 6—6 of Fig. 5, looking in the direction of the arrows;

Fig. 7 is a sectional view taken on the line 7—7 of Fig. 4, looking in the direction of the arrows, with parts broken away;

Fig. 8 is a perspective view of one of the conveyor chain links and integrally formed flights;

Fig. 9 is an enlarged combination plan and sectional view showing the shearing tool adjacent the opening of the working leg which is illustrated in section in Fig. 2 of the drawings;

Fig. 10 is an enlarged sectional elevational view of the tool of Fig. 9;

Fig. 11 is an enlarged sectional view of the tool adjacent the opening to the working leg illustrating the modification of Fig. 4 of the drawings; and Fig. 12 is a sectional view taken on the line 12—12 of Fig. 11, looking in the direction of the arrows.

Referring particularly to Figs. 1, 2 and 3 of the drawings, it will be seen that the conveyor of my invention includes a casing 20 comprising a plurality of interconnected sections including a foot section 21, a feed section 22, intermediate horizontal and vertical or upright sections which are connected together by a curved section 23, and a head section 24. The casing 20 provides a generally L-shaped construction, and casings of this general type are well known in this art and, as is well known, the principal portions of the casing are constructed to provide a working or conveying leg or run 25 and a return leg or run 26. Through the upright sections and through the principal part of the curved section 23 the two mentioned runs 25 and 26 are formed by providing a centrally disposed partition 27 in a substantially totally enclosing rectangular tube or housing.

As illustrated, the horizontal section as well as the feed section 22, is constructed to make the working run 25 and the return run 26 formed thereby as separate casings by virtue of the fact that there are two spaced-apart partitions 28 and 29 forming the bottom of the return run 26 and the top of the working run 25, respectively.

Running through the working and return runs 25 and 26 of the casing 20 is an endless chain conveyor mechanism 30 which is formed by a plurality of chain links 31 having formed thereon integral solid substantially rectangular flights 32. If desired, the flights 32 may be made skeleton type.

As illustrated in Fig. 8 of the drawings, each link 31 is provided at one end with a male pivotal joint 33 and at the other end with a female pivotal joint 34. As clearly illustrated in Fig. 2 of the drawings, the chain conveyor mechanism 30 is formed by connecting successive or alternate links 31, with the flights 32 of the successive links extending forwardly and rearwardly on opposite sides of the axis of travel or, in other words, the longitudinal axis of the chain formed by the connecting links 31, said links, of course, being connected by pivot pins which extend through the female pivotal joint 34 of one link and the male pivotal joint 33 of the next link.

As illustrated particularly in Fig. 2 of the drawings, the direction of travel of the conveyor chain 31 is as indicated by the arrow, and through the working leg 25 the rounded outer and leading edge 35 of each flight 32 is positioned adjacent a wall of the housing forming said working leg 25 with which it may have sliding contact. For example, during the upward travel of the conveyor mechanism 30 through the upwardly extending portion of the working leg 25, a leading or outer edge 35 of one flight will be extending forwardly adjacent the outer wall of the working leg 25, and the next or succeeding flight will have its leading or outer edge 35 extending rearwardly adjacent the inner wall of said working leg which is the partition 27.

The link 31 is spaced with respect to the side edges of the flight 32 at substantially the center of said flight. Consequently, each flight extends laterally on both sides of each link. Where in the claims reference is made to lateral or side extensions of the flights, this refers to their extension toward the side walls. As a consequence, the chain formed by links 31 will travel substantially along the center lines of both the working run 25 and the return run 26 out of contact with the casing, and this is helpful to prevent binding by compression of material as the chain travels around the curved section 23.

It is further to be noted that each flight 32 only extends forwardly or rearwardly of the link 31, but, as clearly illustrated in the drawings, each flight 32 preferably extends the full width of the link 31, as viewed in Fig. 8 of the drawings, for example. That is, if the flight is laid on a flat surface, as illustrated in Fig. 8, not only will the bottom or back of the link 31 contact the flat surface, but so will the bottom or trailing edges of the flight 32.

The plane of the leading or top face of the flight 32, which is the conveying face, preferably forms an acute angle with the axis of the link 31, and this plane is parallel to the pivotal axes of both the male and female pivotal joints 33 and 34.

In the claims, the expressions forwardly or rearwardly, or their equivalents, or derivatives, when used to define the chain or a chain link and flight, shall be understood as referring to the chain as viewed in the upwardly extending portion of the working leg 25, or the equivalent, the front being at the right, as viewed in Fig. 1.

In view of the construction of said chain 31 and flight 32, as above described and as clearly illustrated in Fig. 2 of the drawings, it is evident that successive flights not only extend alternately forwardly and rearwardly of the axis of travel of the chain 31, but that the trailing or inner edges of successive flights 32 overlap each other and each crosses the longitudinal axis of the chain 31. As a consequence, the material which is within the working leg does not form any straight continuous column, or in other words, it is impossible to move through the working leg 25 along a straight path except, of course, as such may be provided by clearance between the edges of the flights and said working leg.

On the other hand, it is obvious that no flight 32 alone substantially fills the cross-sectional area of the working leg 25, or, in other words, each flight extends only partially across the working leg 25 and return leg 26. There is therefore a continuous but zigzag or sinuous path of material which under normal conditions will extend throughout the working leg 25. As a consequence, the action of material being conveyed in the working leg tends to force the flights against a forward or rearward wall of said working leg. This makes a non-positive type of conveyor mechanism 30, even though each of the flights is alone solid as distinguished from the skeleton type. The advantages of this arrangement are that an extremely simplified construction is provided which under extreme conditions, will permit relative movement between the conveyor mechanism 30 and the material being conveyed, comparable to that afforded by the well-known skeleton flight construction.

The conveyor mechanism 30 runs between a head sprocket 36 which is driven by an electric motor 37, both associated with the head section 24, and a foot sprocket 38 associated with the foot section 21. The head section 24 also includes a discharge chamber 39 having a front discharge opening 40 and also preferably includes a dribble plate 41 forming the bottom and rear portion of the chamber 39, which operates to gather material and direct it to the discharge opening 40.

Attention is now directed particularly to Figs. 1 and 2 of the drawings and to the construction of the feed section 22 and the foot section 21. The feed section 22 is provided with a hopper or feed chamber 42 which communicates with an opening in the top of the return run 26 as formed by said feed section 22. Material delivered to the hopper 42 will pass through the bottom opening thereof and into the adjacent portion of the return run 26 by which it will be conveyed rearwardly along what is a short working leg or feed section 43 though it is structurally essentially a portion of the return run 26.

The material fed through the short working leg or feed section 43 by the conveyor mechanism 30 is delivered to a feed chamber 44 formed by the rear end of the feed section 22 and the front portion of the foot section 21, and it is obvious that material delivered to said feed chamber 44 will be fed by the working or conveying run of the conveyor mechanism 30 into the working or conveying run 25 of the casing 20 by way of communicating opening 45.

It has been found in practice that some material, particularly large lumpy material, of which bituminous coal of the size of two inches or thereabout may be an example, ofttimes tends to bind particularly adjacent the opening by which the short working leg or feed section 43 communicates with the hopper 42, and a similar action has been found to take place where the working or conveyor run 25 communicates with the feed chamber 44 by way of opening 45.

To overcome this objectionable characteristic and to prevent damage either to the casing or to the endless conveyor mechanism 30, I have provided certain special construction now to be described.

It will be seen by reference to Fig. 2 of the drawings that the overall height and consequently the cross-sectional area of the short feed section 43 is greater than the height and consequently the cross-sectional area of the return run 26. It will also be seen that the opening leading to this short feed section 43 from the hopper 42 is controlled by a drum or roller 46 which is shown more in detail in Figs. 5 and 6 of the drawings. The drum 46 is mounted on a shaft 47 which extends through elongated slots in the side walls of the hopper 42, and the opposite ends thereof are received in slidable bearing blocks, one of which is seen at 48. Said block 48 is provided with an integral bolt 49 which extends through an aperture in an angle bracket 50 mounted on a side plate of the hopper 42 and provided with an adjusting nut 51. A coil spring 52 surrounds the bolt 49 and abuts the bracket 50 and thus urges the roller 46 to a minimum opening position of adjustment. It is obvious that as the flights 32 travel toward the roller 46, said roller is free to give and move upward against the action of the springs 52, or one of them, in case any large particle of material becomes lodged between the upper edge of the flight 32 and said drum or roller 46.

Since the short feed section 43 has an appreciable height as compared with the height of the working or return runs 25 and 26, any large particle of material which passes the roller 46 can pass freely through said short feed section 43 and into the chamber 44. The top portion of said short feed section 43 is preferably provided at each side with a wear strip 53, the bottom of which will be adjacent the upper edges 35 of the flights 32, and thus will keep the flights held down to the partition 23 forming the bottom of said return run 26 as well as the bottom of the short feed section 43.

The two aforementioned plates 28 and 29 lead to a transversely extending casting 54 which extends transversely between the vertical side walls of the section 22 and is bolted thereto by a transversely extending bolt 55 (see Fig. 9). The bottom of the casting 54 is provided with a removable serrated or toothed tool or blade 56 which forms a sharp serrated edge along the top of the opening 45 leading from the feed chamber 44 into the working run 25. This sharp tool or blade 56 will co-operate with the flights 32 to shear off or lift up or push down any large particle of material which is caught between the flight 32 and said tool, thus preventing any damage to the conveyor mechanism or to the casing by virtue of any large particles of material being caught as the material is fed from the feed chamber 44 into the working leg or run 25.

In Fig. 4 of the drawings I have illustrated different mechanism for controlling the feed from the hopper 42 into the short feed section 43, as well as modified means for controlling the feed from the feed chamber 44 through the opening 45 into the working leg or run 25. In this modification the hopper 42 instead of having the drum 46, has a transversely extending casting 58 adjacent the opening which leads from the hopper 42 to the feed section 43 which at its lower edge carries an adjustable cut-off plate 59 which may be adjusted up and down by virtue of elongated slots therein and co-operating nuts and bolts 60. Behind the cut-off plate 59 in the direction of travel of the material, is a transversely extending pivoted opening controlling plate 61 which is pivoted to the casting 58 by a pin 62 (see particularly Fig. 7 of the drawings).

Coiled about the pivot pin 62 is a biasing spring 63, one end of which abuts the casting 58 and the other the reverse side of the plate 61 and urges the plate 61 to the full line position illustrated in Fig. 4 of the drawings, which is the extreme counterclockwise position to which it is permitted to move by virtue of co-operating stop means between said plate 61 and the casting 58. It is evident that the plate 61 can pivot to relieve any pressure thereon created by a large lump of material being caught between its bottom edge and a flight 32, and the maximum upward position of the plate 61 is illustrated in dotted lines in Fig. 4 of the drawings.

Also in Fig. 4 of the drawings I have illustrated a different form of tool as a substitute for the casting 54 and tool or blade 56. This tool is in the form of a pivoted casting 64 (see particularly Figs. 11 and 12 of the drawings), which is pivotally attached to a pin 65 extending between the side walls of the section 22.

The bottom forward edge of the casting 64 provides a transverse knife edge 66 which of course forms a cutting tool or blade to shear off any large particle of material caught between it and a flight 32 as the material passes through the opening 45 from the chamber 44 into the working leg or run 25. The casting 64 is urged to the position illustrated in Figs. 4 and 11 of the drawings by means of a pair of coil springs 67 which are wrapped about the pin 65, with one end of each abutting an interior web of the casting 64 and the other end abutting the plate 28. It is obvious that the casting 64 not only will shear off any large particles, as above described, but it is free to swing in a counterclockwise direction against the tension of the springs 67 to relieve the jammed condition. It is, of course, evident that the tool 64, 65 may be substituted for the tool 54, 56, etc., and vice versa.

To review briefly the operation of the apparatus as disclosed, particularly in the form illustrated in Fig. 2 of the drawings, material to be fed, such as granular material of which bituminous coal is one illustration, will be delivered to the hopper 42 and will pass through the open bottom thereof into the opening formed in the return run 26 of the casing 20. This material will then be conveyed rearwardly in the direction of the arrow, through the short feed section 43 by way of the opening provided between the hopper or feed chamber 42 and said feed section 43, the size of which is controlled by the drum or roller 46. Should any material be caught between the upper edge 35 of a flight 32 and the roller 46, the roller will be free to roll as well as to move upwardly, which will have a crushing action on the material while at the same time allowing it to move into the short feed section 43 from which it will discharge into the feed chamber 44 as it passes over the upper end of the casting 54. Said material will then flow by gravity in the feed chamber 44 into the working run of the endless chain conveyor mechanism 30. Said conveyor mechanism 30 then carries the material forward to the opening 45 and into the working leg 25 and thence throughout the length of the working leg 25 to the discharge chamber 39 where the material is discharged through the opening 40.

The tool or knife 56 adjacent the opening 45 will shear off any large particles that may become caught between said blade and a flight 32, or in some instances the blade 56 will merely depress the material as it moves along, or in other instances the blade will catch the lower side of the material and lift it up whence it will again flow into the path of said conveying mechanism 30.

The feed and foot sections above described are claimed in my co-pending application S. N. 519,834, filed January 27, 1944, for a Conveyer.

In any event it is evident that binding between the flights 32 and the casing is prevented at those points where binding normally occurs, particularly with material which includes relatively large particles having the size, for example, of two inches or greater. As a consequence, material of this type may be efficiently and safely handled without damaging the conveyor casing or endless chain conveyor mechanism.

The operation of the apparatus as illustrated in Fig. 4 is essentially the same as that above described except, of course, the plate 61 instead of rolling the material which tends to bind, merely swings under the influence thereof, while at the same time exerting pressure thereon, tending to push the material down or to reduce it.

The tool 64, 65 is similar to the tool 54, 56 except that it has the additional feature of being pivoted to swing, and the cutting edge thereof is shown as a straight edge rather than a serrated or toothed edge, though if desired it may also be serrated or toothed. The pivotal movement of this tool 64, 65, of course, gives it added relief characteristics since in case a very hard particle becomes caught between a flight and the tool edge, it will not be necessary to cut it, but the tool can release by swinging on its pivot.

It may also be pointed out that the novel conveyor mechanism presents flights 32 each of which sweeps only part of the cross-sectional area of the working leg or run 25 as well as the return leg or run 26, but due to the alternate arrangement of succeeding flights, substantially the entire cross-sectional area of each of said runs is swept by the conveyor. In other words, there is an overlapping of the trailing edges of alternate or successive flights. The outer edges of the flights are preferably leading and it is evident that successive flights lie in intersecting planes.

It is therefore evident that, viewed in one light, there is a continuous sinuous or zig-zag path of material extending from the feed opening 45 of the working or conveying leg or run 25 to the discharge chamber 39 which will provide for some slippage between the conveyor mechanism 30 and the material, under extreme conditions of overload.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyor including a casing providing an enclosed upwardly extending working leg, conveyor mechanism in said leg including a link chain, flights attached to the links of said chain, successive flights extending forwardly and rearwardly respectively of said chain during the upward travel thereby to maintain the chain out of contact with the forward and rearward walls of the working leg while traveling through said upwardly extending working leg, said successive flights lying in intersecting planes each of which makes an acute angle with the axis of the chain during the upward travel, and each flight having a leading edge adjacent the casing and sloping downwardly therefrom while traveling through said working leg.

2. A conveyor including a casing providing an enclosed upwardly extending working leg, conveyor mechanism in said leg including a link chain, flights attached to the links of said chain, successive flights extending forwardly and rearwardly respectively of said chain during the upward travel thereby to maintain the chain out of contact with the forward and rearward walls of the working leg while traveling through said upwardly extending working leg, and each flight having a leading edge adjacent the casing and sloping downwardly therefrom while traveling through said working leg.

3. A conveyor including a casing providing an enclosed upwardly extending working leg, conveyor mechanism in said leg including a link chain, flights attached to the links of said chain, successive flights extending forwardly and rearwardly respectively of said chain during the upward travel thereby to maintain the chain out of contact with the forward and rearward walls of the casing while traveling through said upwardly extending working leg, said successive flights lying in intersecting planes each of which makes an acute angle with the axis of the chain during the upward travel.

4. A conveyor including an upwardly extending enclosing working leg, conveyor mechanism extending through said leg including a link chain, solid flights on said chain, successive flights extending forwardly and rearwardly respectively of said chain and in overlapping relation, each flight lying in a single plane and extending only partially across said working leg and having a leading edge adjacent a wall of the casing of said working leg and a trailing edge spaced therefrom.

5. A conveyor including an upwardly extending enclosing working leg, conveyor mechanism extending through said leg including a link chain, solid flights on said chain in overlapping relation, each flight extending only partially across said leg, some of said flights extending forwardly and others rearwardly through said working leg, to keep said chain out of contact with the walls thereof, and all of said flights lying in planes whereby the action of the material being conveyed in the working leg of the conveyor tends to force the flights against a wall of the working leg.

6. A conveyor including a casing providing an enclosed upwardly extending working leg, conveyor mechanism in said leg including a link chain, flights attached to links of said chain, each of said flights being so constructed that the periphery thereof along one portion does not extend beyond said chain and therefore extends only partially across the working leg, said flights being mounted on links of said chain so that either an outer or a side edge of a flight travels adjacent each enclosing wall of said working leg and said chain is thereby guided by said flights substantially along the center line of said working leg and out of contact with all of the walls thereof, said flights having surfaces lying in planes making acute angles with the axes of said links.

7. A conveyor including a casing providing an enclosed upwardly extending working leg, conveyor mechanism in said leg including a link chain, flights attached to links of said chain, each of said flights being so constructed that the periphery thereof along one portion does not extend beyond said chain and therefore extends only partially across the working leg, said flights being mounted on links of said chain and in planes extending outwardly in the direction of travel of the chain so that either an outer or a side edge of a flight travels adjacent each enclosing wall of said working leg and said chain is thereby guided by said flights substantially along the center line of said working leg and out of contact with all of the walls thereof.

8. A conveyor including a casing providing an enclosed upwardly extending working leg, conveyor mechanism in said leg including a link chain, flights attached to links of said chain, each of said flights being so constructed that the periphery thereof along one portion does not extend beyond said chain and therefore extends only partially across the working leg, said flights being mounted on links of said chain so that either an outer or a side edge of a flight travels adjacent each enclosing wall of said working leg and said chain is thereby guided by said flights substantially along the center line of said working leg and out of contact with all of the walls thereof, the outer edges of said flights leading the inner edges.

9. A conveyor including a casing providing an enclosed upwardly extending working leg, conveyor mechanism in said leg including a link chain, flights attached to the links of said chain, some of said flights extending forwardly the others rearwardly of said chain during its upward travel thereby to maintain the chain out of contact with the forward and rearward walls of said working leg while traveling therethrough, none of said flights alone filling the cross-sectional area of the working leg, oppositely extending flights lying in intersecting planes each of which makes an acute angle with the axis of the chain during its upward travel, and each flight having a leading edge adjacent the casing and sloping downwardly therefrom while traveling through said working leg.

10. A conveyor including a casing providing an enclosed upwardly extending working leg, conveyor mechanism in said leg including a link chain, flights attached to the links of said chain, some of said flights extending forwardly the others rearwardly of said chain during its upward travel thereby to maintain the chain out of contact with the forward and rearward walls of said working leg while traveling therethrough, oppositely extending flights lying in intersecting planes each of which makes an acute angle with the axis of the chain during its upward travel, and each flight having a leading edge adjacent the casing and sloping downwardly therefrom while traveling through said working leg.

11. A conveyor including a casing providing an enclosed upwardly extending working leg, conveyor mechanism in said leg including a chain having links, flights on said links, said flights extending outwardly of said chain laterally on opposite sides thereof as well as forwardly and rearwardly whereby the chain is held spaced from all the walls of said working leg, each of said flights making an acute angle with said chain, with the outer edge thereof in a leading relation, each of said flights traversing less than the entire cross-sectional area of said working leg.

12. A conveyor including a casing providing an enclosed upwardly extending working leg, conveyor mechanism in said leg including a chain having links, flights on said links, said flights extending outwardly of said chain laterally on opposite sides thereof as well as forwardly and rearwardly whereby the chain is held spaced from all the walls of said working leg, each of said flights making an acute angle with said chain, each of said flights traversing less than the entire cross-sectional area of said working leg.

13. A conveyor including a casing providing an enclosed upwardly extending working leg, conveyor mechanism in said leg including a chain having links, flights on said links, said flights extending outwardly of said chain laterally on opposite sides thereof as well as forwardly and rearwardly whereby the chain is held spaced from all the walls of said working leg, each of said flights making an acute angle with said chain.

PAUL V. WHITNEY.

REFERENCES CITED

The following references are of record in the file of this patent:

UNITED STATES PATENTS

| Number | Name | Date |
|--------|------|------|
| 347,388 | Shortsleeve | Aug. 17, 1886 |
| 645,946 | Evans | Mar. 27, 1900 |
| 831,658 | Ericsson | Sept. 25, 1906 |
| 865,837 | Weston | Sept. 10, 1907 |
| 1,473,633 | Lea | Nov. 13, 1923 |
| 2,007,874 | Redler | July 9, 1935 |
| 2,066,866 | White | Jan. 5, 1937 |
| 2,147,199 | Hapman | Feb. 14, 1939 |
| 2,226,989 | Young | Dec. 31, 1940 |
| 2,235,854 | Sayers | Mar. 25, 1941 |
| 2,252,460 | Sinden | Aug. 12, 1941 |
| 2,290,077 | Linden | July 14, 1942 |
| 2,322,474 | Sayers | June 22, 1943 |